W. F. WITTICH.
TUNNELING MACHINE.
APPLICATION FILED JULY 3, 1911.
1,191,864.
Patented July 18, 1916.
4 SHEETS—SHEET 3.
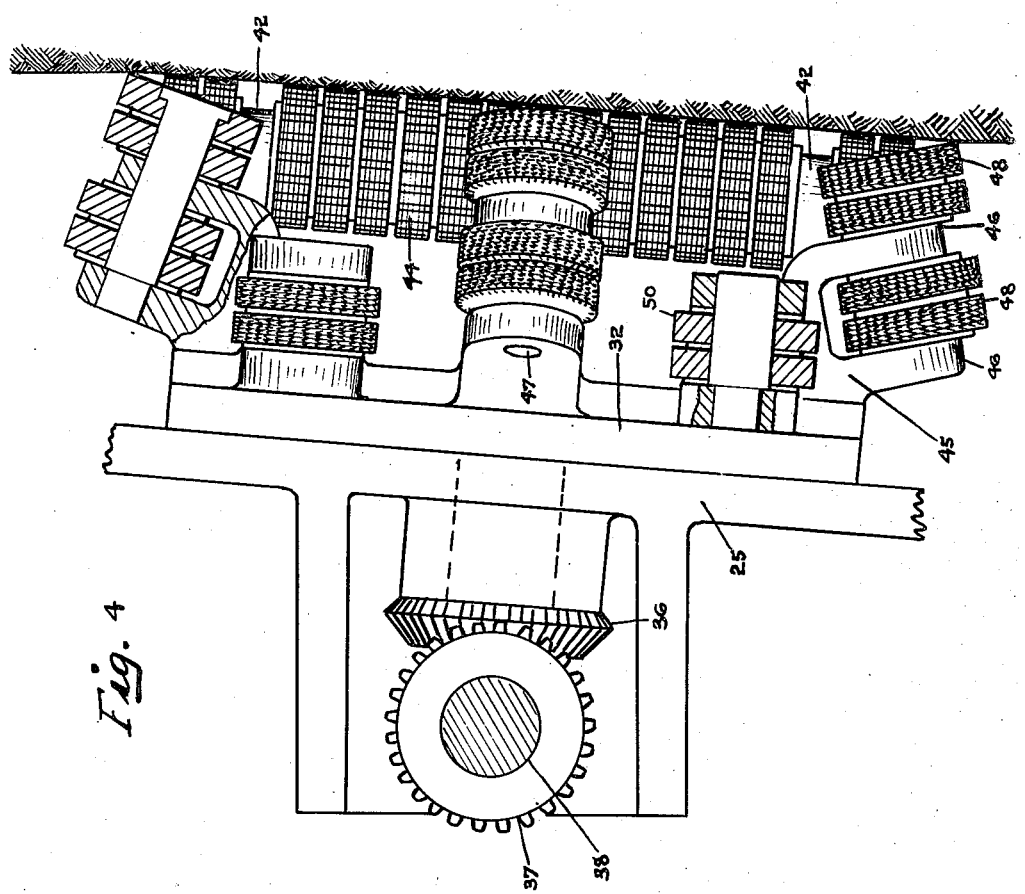

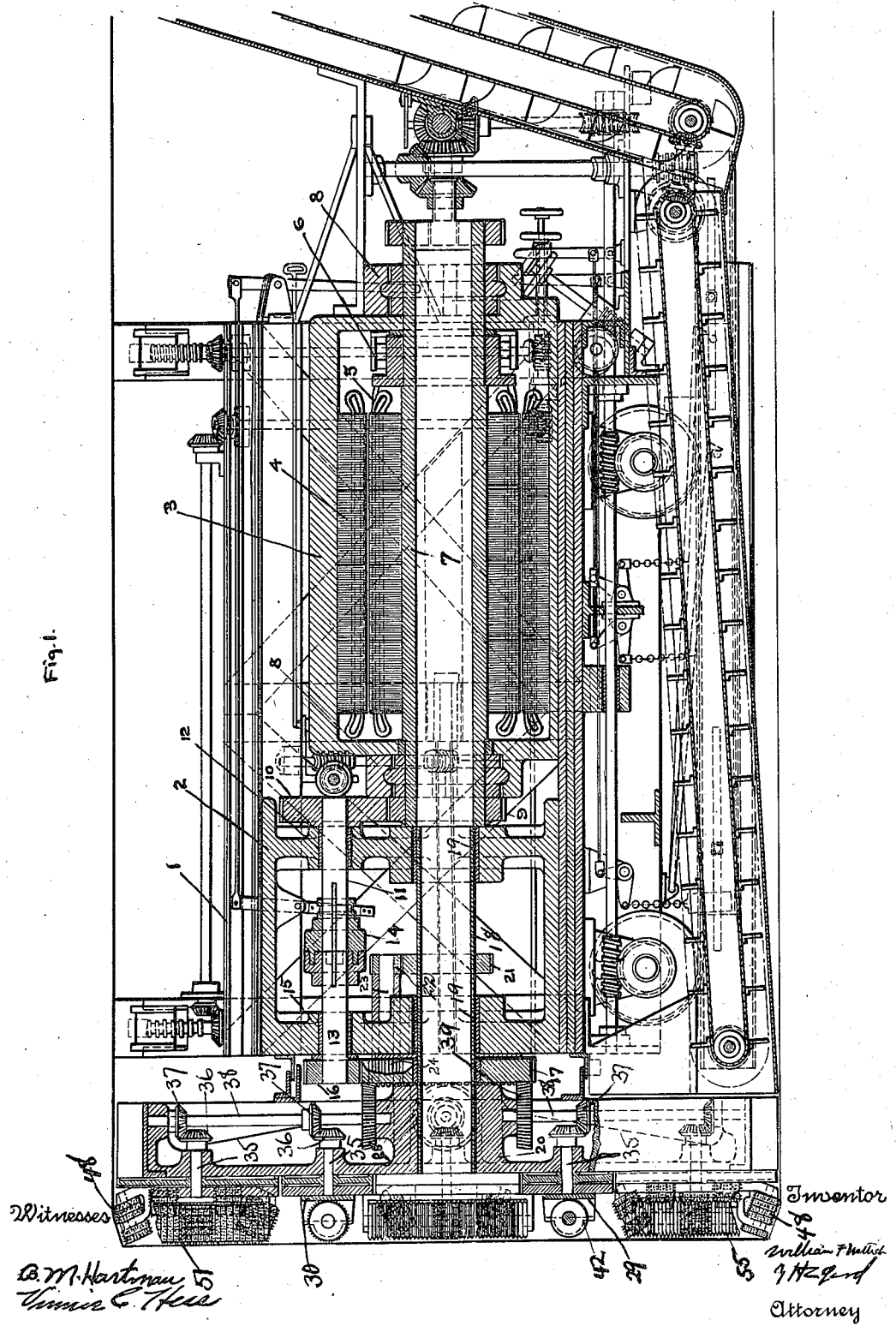

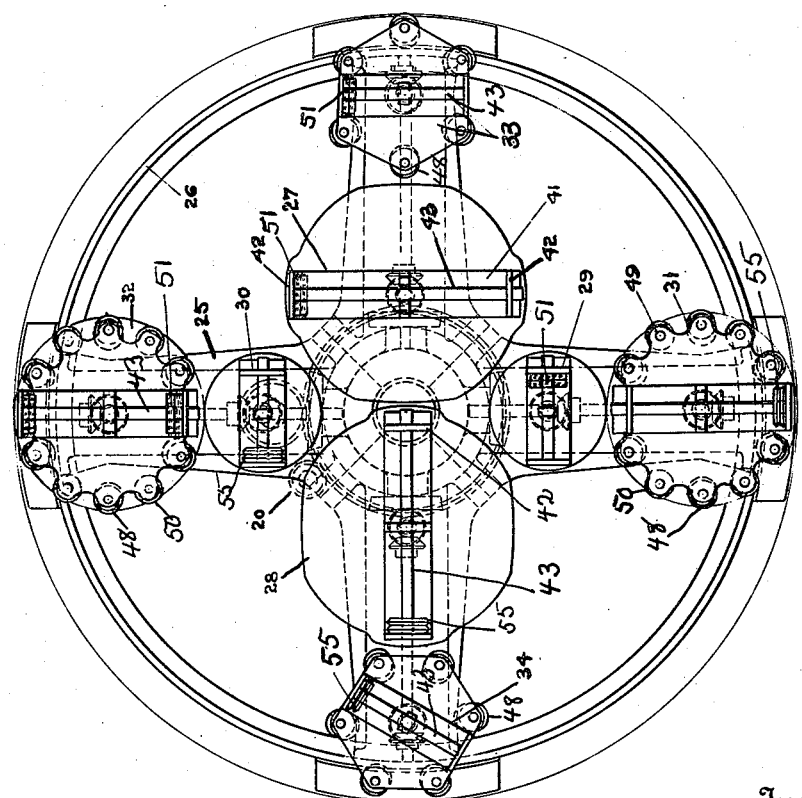

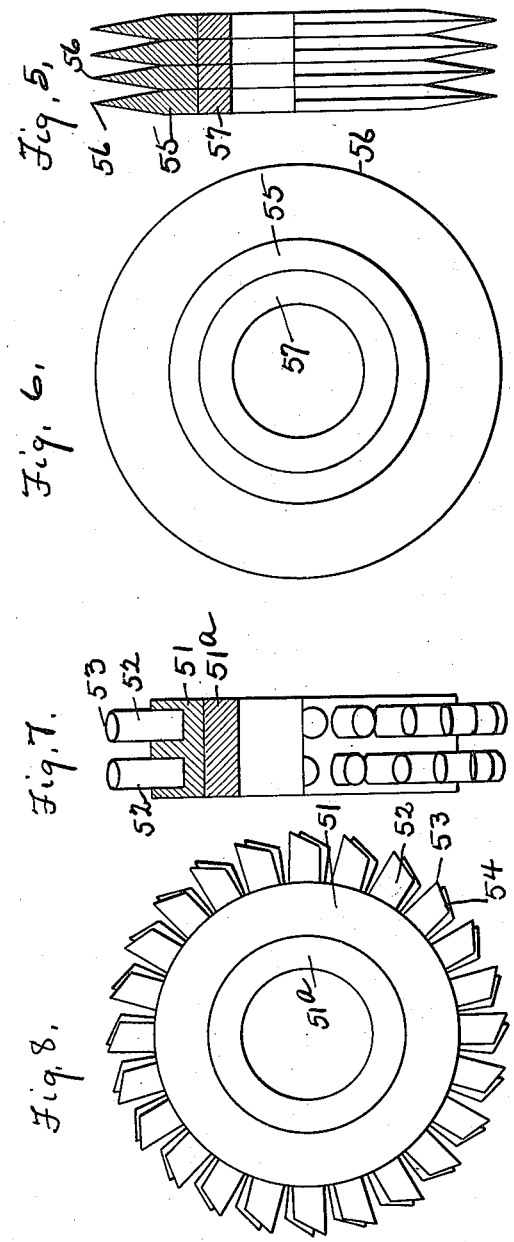

UNITED STATES PATENT OFFICE.

WILLIAM F. WITTICH, OF ERIE, PENNSYLVANIA.

TUNNELING-MACHINE.

1,191,864. Specification of Letters Patent. Patented July 18, 1916.

Application filed July 3, 1911. Serial No. 636,704.

*To all whom it may concern:*

Be it known that I, WILLIAM F. WITTICH, a citizen of the United States, residing at Erie, in the county of Erie and State of Pennsylvania, have invented new and useful Improvements in Tunneling-Machines, of which the following is a specification.

This invention relates to tunneling machines, and consists in certain improvements in the construction thereof as will be hereinafter fully described and pointed out in the claims.

More particularly, my invention relates to the form of head and manner of operating the head of a tunneling machine.

The invention is illustrated in the accompanying drawings as follows:

Figure 1 shows a central section through the machine indicating the mounting of the head and the manner of driving the same. Fig. 2 a face view of the head. Fig. 3 a side elevation of the head, the same being partly in section. Fig. 4 an enlarged view of one of the cutting heads. Fig. 5 a plan view, partly in section, of one type of cutter. Fig. 6 a side elevation of the same. Fig. 7 a plan view, partly in section, of a second type of cutter. Fig. 8 a side elevation of the same.

1 marks the frame. This may be of any desirable shape.

2 marks the bearing frame carried by the frame 1, 3 a motor frame carried by the frame 1. The field 4, armature 5 and commutator 6 are shown in outline. The armature shaft 7 is carried by the bearings 8 in the frame 4.

The power is carried from the electric motor by the following mechanism: The gear 9 is fixed on the shaft 7, and meshes a gear 10. The gear 10 is fixed on a shaft 11 which is journaled in the bearing 12 in the bearing frame 2. The shaft 11 drives the shaft 13 through the clutch 14. A gear 16 is fixed on the shaft 13. The gear 16 drives a gear 17 journaled on the shaft 18. The shaft 18 is carried by bearings 19 in the bearing frame.

The main head 20 is fixed on the shaft 18.
This head is driven from the gear 17 by the following mechanism: The gear 21 is fixed on the shaft 18. This meshes a gear 22. The gear 22 is fixed on the shaft 23. The shaft 23 is carried in the bearings in the bearing frame 2. A gear 24 is fixed on the shaft 23 and meshes a gear 17.

In this machine, the main head 20 is rotated slowly and there is mounted on this main head a series of rotating cutter bearing heads which operate directly upon the face.

The main head is provided with the arms 25 which are joined by the rim 26. Cutter heads 27, 28, 29, 30, 31, 32, 33 and 34 are mounted on the arms of the main head. They are carried by the shafts 35 which are arranged in bearings in the arms of the main head. Gears 36 are fixed on the shafts 35, and the gears 36 mesh gears 37 on the shafts 38. The shafts 38 extend radially back of the arms and are mounted in bearings on the main head. Gears 39 are fixed on the shafts 38, and mesh a gear 40 on the side of the gear 17 (see Fig. 3).

It will be noted that as the gear 17 is rotated, the cutter bearing heads through the gearing just described are rotated relatively to the main head 20.

Each of the cutter heads has a cross frame 41 with upwardly extending ears 42 and a shaft 43 between the ears 42. Arranged on the shafts 43 are the cutters. These are of two types as shown in Figs. 5, 6, 7 and 8, and it will be noted that the cutter heads 27 and 28 are similar and occupy symmetrical positions on the head and this is also true of 29 and 30, 31 and 32, 33 and 34 respectively. One of each pair of cutter bearing heads is preferably provided with one type of cutter, and its companion cutter bearing head is provided with the other type of cutter.

In order that the cutters on the cutter bearing heads may all be operating upon the tunnel or tunnel face of the bore, I prefer to tilt the cutter bearing heads slightly with relation to the face of the main head so that the side of each cutter head toward the rear considered in relation to the direction of travel of the head will present a deeper cut to the face than the forward side of the cutter bearing head. In this way, a shoulder along the face of the head is prevented and all the cutters of the head are brought into action as the main head is rotated. The immediate face occupied by a cutter bearing head is slightly on the slant to the general plane of the face as clearly shown in Fig. 4. In this figure the cutter head 32 is shown as occupying the position in the drawings of the cutter head 33. In other words, the view shown in Fig. 4 is one toward the axis of the shaft 18. The direction of movement is toward the bottom of that figure. It will be noted that the head 32 is at a slight angle. The amount of the angle can be observed by the fact that the line indicating the tunnel face at the top and bottom of the figure is perpendicular to the axis of the main shaft 18 and the tunnel face directly under the cutters is at an angle to this.

The head shown in Fig. 4 is the cutter bearing head 32 and as shown is occupying a position on the face similar to the cutter bearing head 33 in Fig. 2. The details of the construction shown in Fig. 4 are as follows: Cutters 44 are mounted on the shaft 43. The shaft 43 is carried by the ears 42 mounted on the head 32. Arranged on the head 32 there are also brackets 45 having the ears 46. Shafts 47 are arranged in these ears, the shafts being arranged at an angle to the axis of the shaft 18, the path of the shafts 47 nearest the head being the larger. In this way the surface made by the cut of the cutters 48 is conical with the smaller end of the cone frustum in the direction of the bore. Cutters 48 are arranged on the shaft 47. The purpose of these cutters is to break down the wall along the corner of the face of the tunnel. Studs 49 (see Fig. 2) are also arranged on the cutter bearing head. These studs are parallel with the axis of the head and cutters 50 are arranged on these studs. These are to supplement the cutters 48 on the circumferential walls of the tunnel. The cutters shown in Fig. 8 comprise a collar or hub 51 on which are arranged the teeth 52. The teeth 52 have the points 53 which are beveled off leaving a point 54 nearer the center of the cutter. The cutter rotates by traction as the cutter head is rotated and the points 53 coming in contact with the face, cut the face and as the rotation progresses, the tooth is fulcrumed on the point 54, and a slight portion of the face is broken out. This feature in a broad way is shown and claimed in a former application # 537,146, filed Jan. 10, 1910. The head hub 51 has the friction collar 51ª between it and the shaft 27.

The cutter having the hub 51 tends to make radial ribs in the face. In order to break these down, I provide the cutters 55 which have a continuous periphery. They are mounted on the shafts 27 with an interposed collar 57.

What I claim as new is:

1. In a tunneling machine, the combination of a main head; means for rotating the main head; a tool carrying head rotatively mounted on the main head with its axis in the same general direction as the main head; rotary tools relatively mounted on the tool carrying head, the axes of the tools being noncoincident with the axis of the tool carrying head; and means for rotating the tool carrying head relatively to the main head.

2. In a tunneling machine, the combination of a main head; means for rotating the main head; a tool carrying head rotatively mounted on the main head with its axis in the same general direction as the main head; rotary tools relatively mounted on the tool carrying head with their axes radial to the axis of the tool carrying head; and means for rotating the tool carrying head relatively to the main head.

3. In a tunneling machine, the combination of a main head; means for rotating the main head; a tool carrying head rotatively mounted on the main head with its axis in the same general direction as the main head; rotary tools rotatively mounted on the tool carrying head and provided with a series of radially extending cutting points, the axes of the tools being noncoincident with the axis of the tool carrying head; and means for rotating the tool carrying head relatively to the main head.

4. In a tunneling machine, the combination of a main head; means for rotating the main head; a tool carrying head rotatively mounted on the main head with its axis in the same general direction as the main head; rotary tools rotatively mounted on the tool carrying head and provided with a series of radially extending cutting points, said tools being arranged to operate by traction and the cutting points having a beveled surface extending therefrom in a position to be brought into contact with the face after the contacting of the cutting points, the axes of the tools being noncoincident with the axis of the tool carrying head; and means for rotating the tool carrying head relatively to the main head.

5. In a tunneling machine, the combination of a main head; a plurality of tool carrying heads rotatively mounted on the main head with their axes in the same general direction as the axis of the main head; tools rotatively mounted on said tool carrying heads, said tools having varying cutting faces for operating over the same surface of the tunnel face, the axes of the tools being noncoincident with the axis of the tool carrying head; and means for rotating the tool carrying heads relatively to the main head.

6. In a tunneling machine, the combination of a main head; a plurality of tool carrying heads rotatively mounted on the main head with their axes in the same general direction as the axis of the main head; rotative tools rotatively mounted on the tool carrying heads with their axes radial to the axes of the tool carrying heads, said tools having varying cutting faces for operating over the same surface of the tunnel face; and means for rotating the tool carrying heads relatively to the main head.

7. In a tunneling machine, the combination of a main head; means for rotating the main head; a tool carrying head rotatively mounted on the main head with its axis in the same general direction as the main head but tilted thereto to present a slanting face toward the work to make a deeper cut at the rear of the tool carrying head; rotative tools mounted on the tool carrying head on the face thereof, the axes of the tools being non-coincident with the axis of the tool carrying head; and means for rotating the tool carrying head relatively to the main head.

8. In a tunneling machine, the combination of a main head; means for rotating the main head; a tool carrying head rotatively mounted on the main head with its axis in the same general direction as the main head but tilted thereto to present a slanting face toward the work to make a deeper cut at the rear of the tool carrying head; rotative tools mounted on the face of the tool carrying head with their axes radial to the tool carrying head; and means for rotating the tool carrying head relatively to the main head.

In testimony whereof I have hereunto set my hand in the presence of two subscribing witnesses.

WILLIAM F. WITTICH.

Witnesses:
B. M. HARTMAN,
VINNIE C. HESS.